United States Patent Office 2,852,496
Patented Sept. 16, 1958

2,852,496
POLYMERS OF ALLYLOXAMIC ACID ESTERS AND AMIDE DERIVATIVES THEREOF

John R. Caldwell and Edward H. Hill, Kingsport, Tenn., assignors to Eastman Kodak Company, Rochester, N. Y., a corporation of New Jersey No Drawing. Application April 18, 1956
Serial No. 578,897

12 Claims. (Cl. 260—78)

The invention relates to resinous copolymers containing allyloxamic acid esters, to amide derivatives thereof, and to a process for their preparation.

The new resinous copolymers of the invention comprise a substantial proportion of an allyloxamic acid ester represented by the following general formula:

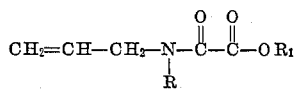

wherein R represents a hydrogen atom, an alkyl group and a hydroxyalkyl group, and $R_1$ represents an alkyl group, a hydroxyalkyl group and an alkoxyalkyl group, and wherein in each instance the said alkyl group contains from 1 to 4 carbon atoms, e. g. methyl, ethyl, propyl, isopropyl, n-butyl, 2-hydroxyethyl, 2-hydroxypropyl, methoxyethyl, ethoxyethyl, butoxybutyl, etc. groups, in combination with various different polymerizable unsaturated monomers (comonomers), other than the above defined allyloxamic acid esters, such as vinyl monomers, acrylic monomers, etc., in the proportions by weight of from 4 to 35%, but preferably from 10 to 25% of the above defined allyloxamic acid esters and from 96 to 65%, but preferably from 90 to 75% of the other different comonomers. The copolymeric products are soluble in one or more organic solvents such as chloroform, carbon tetrachloride, dioxane, etc., and those copolymers containing a large proportion (60% or more) of acrylonitrile are soluble in polyacrylonitrile solvents such as dimethylformamide, dimethylacetamide, γ-butyrolactone, dimethylsulfolane, etc., from which solutions they can be readily cast into films that are useful as photographic film supports, and the acrylonitrile containing copolymers spun into fibers having good affinity for various textile dyes. The copolymers in the invention are also valuable as intermediates for preparing derived polymers by treating them with various organic amines, the resulting amides being characterized by particularly good affinity for organic dyes and having excellent physical properties.

It is, accordingly, an object of the invention to provide new resinous copolymers comprising allyloxamic acid esters. Another object is to provide amide derivatives of the same. Another object is to provide a process for preparing these polymers. Other objects will become apparent hereinafter.

In accordance with the invention, we prepare our new copolymers by copolymerizing from 4 to 35% by weight, but preferably from 10 to 25%, of one or more of the above defined allyloxamic acid esters with from 96 to 65% by weight, but preferably from 90 to 75%, of one or more other different polymerizable comonomers. Suitable allyloxamic acid esters include methyl allyloxamate, ethyl allyloxamate, propyl allyloxamate, isopropyl allyloxamate, n-butyl allyloxamate, ethyl N-methyl allyloxamate, ethyl N-ethyl allyloxamate, methyl N-methyl allyloxamate, methyl N-(2-hydroxyethyl) allyloxamate, ethyl N-methoxymethyl allyloxamate, etc. These may be prepared by reacting allylamine or an N-monosubstituted allylamine such as N-methyl allylamine, N-ethyl allylamine, N-2-hydroxyethyl allylamine, etc. with various oxalic acid diesters [Beilstein, 4th ed., vols. 3–4, page 391 (1929)] such as dimethyloxalate, diethyloxalate, dibutyloxalate, di-(2-hydroxyethyl) oxalate, di-(2-methoxyethyl) oxalate, etc., in the proportions of 1 mole of any of the said allylamines with about 1.5–3.0 moles of any of the said oxalic acid diesters, and separating the allyloxamic ester product by vacuum distillation.

The copolymerizations for preparing our new resinous copolymers of allyloxamic acid esters are accelerated by heat, by actinic light and by polymerization catalysts such as peroxides including benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali metal perborates, the water-soluble salts of percarbonic acid, the water-soluble salts of perphosphoric acid, azo-bis-isobutyronitrile, etc. Mixtures of one or more of the catalysts can be employed. The amount of catalyst employed can vary from about 0.2 to 3.0 percent, based on the weight of monomer to be polymerized. An activating agent such as sodium bisulfite can be used, if desired, in conjunction with the polymerization catalysts in aqueous systems. For mass polymerizations, an organic peroxide is preferred. The temperature of polymerization can vary over a wide range, but preferably the polymerizations are carried out at from about 30°–100° C. Chain regulators such as alkyl mercaptans (e. g. hexyl, octyl, lauryl, dodecyl mercaptans, etc.) can also be added with advantage to the polymerization mixtures.

The polymerizations can be carried out in mass or in dispersed form in a nonsolvent for the monomers, the particles of dispersed monomer being very small (emulsion) or relatively large (bead or granular). For dispersion polymerizations, any nonsolvent for the monomers can be employed, water being an especially suitable nonsolvent. Advantageously, an emulsifying or dispersing agent is added to the polymerization mixtures in an amount not exceeding about 3 percent of the weight of monomers. Suitable emulsifying agents include salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts or aromatic sulfonic acids (e. g. sodium or potassium salts of alkylnaphthalene sulfonic acids, etc.), higher molecular weight quaternary ammonium salts (e. g. dimethyl benzylphenyl ammonium chloride, quaternary ammonium salts containing the radicals $C_{15}H_{31}$ and $C_{17}H_{35}$, etc.) or dispersing agents such as starch, methylated starch, gum arabic, finely divided magnesium carbonate, polyvinyl alcohol, and the like. Mixtures of emulsifying and dispersing agent can be used. Stirring, shaking or tumbling of the polymerization mixture during the polymerization reaction gives improved product and yield.

The comonomers that are suitable for copolymerizing with the allyloxamic acid esters to give the resinous copolymers of the invention are different polymerizable compounds containing ethylenic unsaturation i. e. at least one aliphatic —CH=C< group, but preferably those containing but a single aliphatic $CH_2$=C< group, for example, one or more unsaturated compounds from the group including vinyl esters of carboxylic acids (e. g. vinyl acetate, vinyl propionate, vinyl butyrate, vinyl stearate, vinyl trifluoroacetate, vinyl benzoate, etc.), vinyl alkyl ketones (e. g. methyl vinyl ketone, ethyl vinyl ketone, etc.), vinyl alkyl ethers (e. g. methyl vinyl ether, butyl vinyl ether, etc.), vinyl sulfonamides (e. g. vinyl sulfonamide, N-methyl vinyl sulfonamide, etc.), vinyl halides (e. g. vinyl chloride, vinyl bromide, vinyl fluoride), vinylidene halides (e. g. vinylidene dichloride, vinylidene dibromide, vinylidene chloride-bromide, vinylidene difluoride, etc.), vinyl urethanes (e. g. vinyl methyl urethane, vinyl ethyl urethane, etc.), cyclic vinyl imides (e. g. vinyl succinimide, vinyl phthalimide, etc.), N-vinyl lactams, acrylic acid and derivatives thereof such as the amide, N-alkyl amides, nitrile and methyl, ethyl, propyl, butyl, benzyl, phenyl, etc. esters and the corresponding compounds of methacrylic acid, maleic acid, fumaric acid, itaconic acid and citraconic acid, ester-amides such as fumaramates, maleamates, itaconamates, citraconamates, etc., vinyl pyridines, vinyl sulfones, hydrazides of acrylic and methacrylic acids, ethylene, butylene, isoprene, butadiene, 2-chlorobutadiene, 2,3-dimethylbutadiene, and the like. Where two or more of the above group of copolymers are employed the proportions of each can vary in any amount but not exceeding the limiting range of 94 to 65%.

The derived amides of the above described allyloxamic acid ester copolymers may be prepared by reacting the copolymers with various primary amines in approximately the proportions of 1–2 moles of the primary amine to each mole of allyloxamic acid ester units in the copolymer. An important aspect of this process is the discovery by the applicants that the above reaction takes place under relatively mild conditions, it is highly selective and the ester groups of the allyloxamic ester units are substantially all displaced by the desired amide groups. The general reaction of the primary amine and the allyloxamic acid ester group in the polymer may be represented by the following equation:

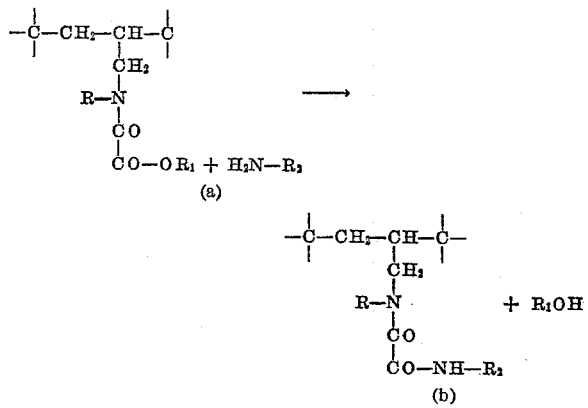

wherein R and $R_1$ are as previously defined and $R_2$ is defined hereinafter. The units represented by above structure (b) constitute from about 4 to 55% by weight of the derived copolymer. The products prepared as above are, therefore, essentially copolymers of a compound having the structure:

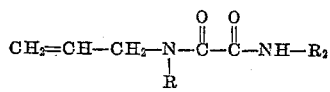

and at least one other different unsaturated, polymerizable compound containing at least one aliphatic $CH_2=C<$ group. The temperatures in the above reaction can vary from 20° to 50° C. Under these conditions, groups such as nitrile, halogen or other types of ester groups are unaffected. Furthermore the ester group of the allyloxamic acid units is separated from the main polymer chain by an appreciable distance and hence is sterically available for reaction. In contrast to the above, polymers and copolymers of methyl or ethyl acrylate undergo ammonolysis with ammonia or primary amines only at minimum reaction temperatures of about 100° C. or higher, which frequently causes undesirable side reactions, especially if nitrile and halogen groups are also present. Furthermore, primary amines containing more than about 3 carbon atoms or those containing branched chains or ring structures react to only a slight extent with ester groups of this type, probably because of steric effects.

The ester group present in allyloxamates is very reactive and will react with most types of aliphatic primary amines at a temperature of 20-50° C. Under these conditions, groups such as nitrile, halogen, and other types of ester groups are unaffected. Furthermore, the ester group of the allyloxamic acid is separated from the polymer chain by an appreciable distance and hence is sterically available for reaction. It is thus apparent that the above process of the invention provides an entirely new and valuable method for modifying and improving the properties of various known ethenoid type polymers. The process is particularly valuable for the production of fibers that have dyeing properties greatly improved over the starting allyloxamic acid ester copolymers. The above derived copolymers are also useful for certain color photographic processes.

Suitable primary amines include those represented by the general formula:

wherein $R_2$ represents an alkyl group containing from 1 to 6 carbon atoms and having a straight or branched chain such as methyl, ethyl, isopropyl, butyl, isobutyl, amyl, hexyl, etc. groups, a cycloalkyl group containing from 5 to 6 carbon atoms in the ring such as cyclopentyl, cyclohexyl or methylcyclopentyl, a hydroxyalkyl group containing from 2 to 4 carbon atoms such as 2-hydroxyethyl, 2-hydroxypropyl, 2,3-dihydroxypropyl, 3-hydroxypropyl, 4-hydroxybutyl, etc. groups, a hydroxycycloalkyl group such as a hydroxycyclohexyl group, an aralkyl group represented by

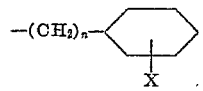

wherein $n$ represents a whole number from 1 to 6 and X represents a monovalent substituent such as hydrogen, hydroxyl, amino, $-NHCH_3$, $-N(C_2H_5)_2$, $-CONH_2$, $-SO_2NH_2$, etc. and corresponding naphthalene groups, a

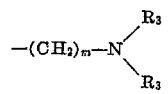

wherein $m$ represents a whole number from 2 to 6 and each $R_3$ represents hydrogen, an alkyl group containing from 1 to 4 carbon atoms, an acyl group such as acetyl, propionyl, etc. or an aryl radical such as phenyl or naphthyl, a group containing ether linkages, i. e. a hydroxyalkoxy group containing from 2 to 7 carbon atoms such as $-(CH_2)_2-O-(CH_3)_2-OH$,

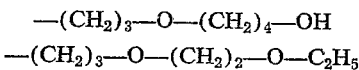

etc., a $-(CH_2)_3-O-C_6H_5$ group, a $-(CH_2)_n-Z$ group wherein $n$ is as above defined and Z is a heterocyclic nucleus derived from pyridine such as a pyridylalkyl group wherein the alkyl group contains from 1 to 4 carbon atoms, or from triazole, melamine, imidazoline, etc.

The copolymers containing allyloxamic acid esters may be treated with the above defined amine compounds under various conditions. The finely divided copolymer may be stirred with an excess of the amine and then washed. If the amine is a gas, the polymer may be exposed to the vapors. Solutions of the copolymers in solvents such as alcohol, dioxane, dimethylformamide, dimethylacetamide, etc. may be mixed with the amine compound. Fibers or films of the copolymer may be treated with solutions of the amine compounds or exposed to the vapor of the amine. Amines containing a phenolic nucleus or aromatic amine nucleus are of particular interest because they can be converted into dyes that are chemically attached to the copolymer molecule. For example, the allyloxamic acid ester copolymer may be treated with an amine such as 2-aminophenol, and the resulting derived copolymer then treated with a diazo compound whereby coupling takes place with the phenol nucleus to give a dye. Also, the allyloxamic acid copolymer may be treated with a phenylene diamine or a naphthalene diamine, followed by diazotization and coupling with suitable aromatic amines or phenols to give other dyes that are chemically attached to the polymer molecule.

The following examples will serve further to illustrate our new allyloxamic acid ester copolymers, and amide derivatives thereof, and the manner of their preparation.

Example 1

A mixture of 5 g. of ethyl allyloxamate, 20 g. of styrene, 0.25 g. of potassium persulfate, 0.25 g. of sodium bisulfite, 0.50 g. of sodium octadecyl sulfate and 200 cc. of water was placed in a bottle and tumbled in a water bath at 50°–53° C. for 20 hours. The copolymer was precipitated by adding sodium sulfate, washed with water, and dried. It weighed 23 g. and was soluble in chloroform, carbon tetrachloride and dioxane. Analysis showed that the copolymer contained 13% by weight of ethyl allyloxamate. The solutions on coating gave tough and flexible sheets that were useful as photographic film supports.

100 parts by weight of a copolymer prepared as above were dissolved in 500 parts by weight of dioxane and 15 parts by weight of monoethanolamine were added. The solution was stirred at 40°–45° C. for 2 hours. The treated copolymer was then recovered by precipitating into water, washing and drying. It contained N-allyl-N'-(2-hydroxyethyl) oxamide units represented by the structure $CH_2=CHCH_2NHCOCONHC_2H_4OH$. Fibers spun from the treated copolymer dyed heavily with acid wool dyes, direct cotton dyes and vat dyes.

Example 2

Using the general method described in Example 1, a copolymer was made that contained 88% by weight of acrylonitrile and 12% by weight of ethyl N-methyl allyloxamate. It was soluble in dimethylformamide from which solution it could be readily spun to fibers that had affinity for various textile dyes.

One hundred parts by weight of the above copolymer were dissolved in 500 parts by weight of dimethylformamide and 15 parts by weight of o-(2-aminoethyl) phenol were added thereto. The solution was stirred at 40°–50° C. for 2 hours and then extruded through a spinneret into a precipitating bath consisting of 60 parts of water—40 parts of dimethylformamide. The fibers were washed, dried and drafted 200–300% in a heated chamber. Treatment of the fibers with an aqueous solution of a diazo salt gave a dye that was chemically combined with the copolymer. The product contained N - allyl - N-methyl-N'-(o-hydroxyphenylethyl) oxamide units represented by the structure $CH_2=CHCH_2N(CH_3)COCONHC_2H_4C_6H_4OH$

Example 3

A copolymer was made by the general method of Example 1 having the composition by weight 85% of acrylonitrile, 5% of ethyl acrylate and 10% of methyl N-(2-hydroxyethyl) allyloxamate. Fibers were made by dry spinning a solution of the copolymer in dimethylacetamide. The fibers were soaked for 3 hours in a 10% water solution of ethylamine. They were then rinsed and dried. The fibers contained N-allyl-N-(2-hydroxyethyl)-N'-ethyl oxamide represented by the structure $CH_2=CHCH_2N(C_2H_4OH)COCONHC_2H_5$. They dyed heavily with acid wool dyes, direct cotton dyes, cellulose acetate dyes, vat dyes and premetallized dyes.

Example 4

A copolymer was made by the general method of Example 1 having the composition by weight of 92% of acrylonitrile and 8% of ethyl allyloxamate. 100 parts by weight of the copolymer were dissolved in 500 parts by weight of dimethylformamide and 10 parts by weight of $H_2N(CH_2)_3—O—(CH_2)_2—OH$ were added. The solution was stirred at 30°–40° C. for 1 hour. Fibers spun from the product dyed well with cellulose acetate dyes, acid wool dyes and direct cotton dyes. The copolymeric product contained N-allyl-N'-(2-hydroxyethoxypropyl) oxamide units represented by the structure $CH_2=CHCH_2NHCOCONH(CH_2)_3O(CH_2)_2OH$

Example 5

A copolymer was made by the general method of Example 1 having the composition by weight of 80% of acrylonitrile and 20% of ethyl allyloxamate. 100 parts by weight of the fine powder obtained were stirred 4 hours with a solution of 25 parts by weight of benzylamine in 300 parts by weight of isopropyl alcohol. The copolymer was then filtered, washed with isopropyl alcohol, and dried. The copolymeric product contained N-allyl-N'-benzyl oxamide units represented by the structure $CH_2=CHCH_2NHCOCONHCH_2C_6H_5$. Fibers spun from the treated copolymer dyed heavily with cellulose acetate dyes, acid wool dyes, direct cotton dyes and vat dyes.

Example 6

Fibers were spun from a copolymer prepared by the general method of Example 1 having the composition by weight of 50% of vinylidene chloride, 35% of acrylonitrile and 15% of methyl allyloxamate. The fibers were placed in a closed vessel and treated with the vapors of n-butylamine at 30°–35° C. for 3–4 hours. The fibers showed no discoloration after the treatment. They dyed well with cellulose acetate dyes, acid wool dyes and premetallized dyes. The fibers contained N-allyl-N'-n-butyl oxamide units represented by the structure $CH_2=CHCH_2NHCOCONHC_4H_9$

Example 7

A copolymer was made by the general method of Example 1 having the composition by weight of 80% of methyl methacrylate and 20% of ethyl allyloxamate. It was dissolved in dioxane and 25% of 4-(2-aminoethyl) pyridine, was added to the solution, based on the weight of the copolymer. The solution was stirred at 35°–40° C. for 2 hours and the copolymer was isolated by precipitating in water and washing. The copolymeric product contained N-allyl-N'-(4-pyridylethyl) oxamide units represented by the structure

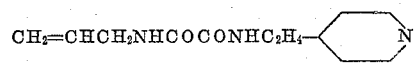

Films cast from the treated copolymer were tough and flexible, and dyed heavily with acid wool dyes.

Example 8

A copolymer prepared by the general process described in Example 1 and having the composition by weight of 95% of ethylene and 5% of ethyl N-ethyl allyloxamate was extruded as a film 2 mils thick. The film was then soaked for 4 hours in a 15% benzene solution of N,N-dibutyl-1,3-propanediamine. The film contained N-allyl-N-ethyl-N'-(N'',N''-dibutylaminopropyl) oxamide units represented by the structure $CH_2=CHCH_2N(C_2H_5)COCONH(CH_2)_3N(C_4H_9)_2$ The treated film could be dyed or printed with wool dyes and cellulose acetate dyes.

Still other alkyl allyloxamate copolymers can be made with any of the mentioned comonomers in the specified range of proportions by following the description and the procedure of the above examples. These copolymers can also be modified by treatment of the copolymers in solution, as powders or in thin sheet form with any of the mentioned suitable amine compounds, the ester groups of the alkyl allyloxamate units being converted to the corresponding amide derivative units. The modified copolymers all have exceptionally good affinity for the indicated commercial textile dyes. Solutions and compositions of both the unmodified and the amine modified copolymers of the invention may contain, if desired, other materials such as fillers, lubricants, plasticizers, etc. Some of the compositions can also be molded into stable, shaped articles by the conventional molding techniques.

What we claim is:

1. A copolymer of from 4 to 35% by weight of an allyloxamic acid derivative selected from the group consisting of compounds represented by the following general formulas:

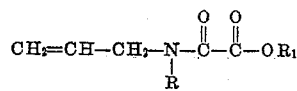

and

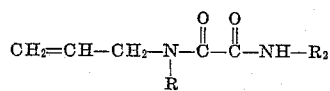

wherein R in each instance represents a member selected from the group consisting of a hydrogen atom, an alkyl group containing from 1 to 4 carbon atoms and a hydroxyalkyl group containing from 1 to 4 carbon atoms, $R_1$ represents an alkyl group containing from 1 to 4 carbon atoms and $R_2$ represents a member selected from the group consisting of an alkyl group containing from 1 to 6 carbon atoms, a hydroxyalkyl group containing from 2 to 4 carbon atoms, a hydroxyalkoxy group containing from 2 to 7 carbon atoms, a pyridylalkyl group wherein the alkyl group contains from 1 to 4 carbon atoms, a group

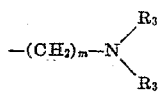

wherein $m$ represents a whole number of from 2 to 6 and each $R_3$ represents a member selected from the group consisting of a hydrogen atom and an alkyl group containing from 1 to 4 carbon atoms, and a

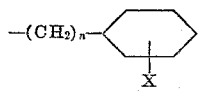

group wherein $n$ represents a whole number of from 1 to 6 and X represents a member selected from the group consisting of hydrogen, a hydroxyl group, an amino group, an N-alkylamino group containing from 1 to 4 carbon atoms, a carbamyl group and a sulfamyl group, and from 96 to 65% by weight of at least one other different unsaturated, polymerizable compound containing at least one aliphatic $CH_2=C<$ group, the said allyloxamic acid derivative and the said other different unsaturated, polymerizable compound containing at least one aliphatic $CH_2=C<$ group being addition copolymerized through the unsaturation.

2. A copolymer consisting of from 4 to 35% by weight of ethyl allyloxamate and from 96 to 65% by weight of acrylonitrile, the said ethyl allyloxamate and the said acrylonitrile being addition copolymerized through the unsaturation.

3. A copolymer consisting of from 4 to 35% by weight ethyl N-methyl allyloxamate and from 96 to 65% by weight of acrylonitrile, the said ethyl N-methyl allyloxamate and the said acrylonitrile being addition copolymerized through the unsaturation.

4. A copolymer consisting of from 4 to 35% by weight of ethyl allyloxamate and from 96 to 65% by weight of methyl methacrylate, the said ethyl allyloxamate and the said methyl methacrylate being addition copolymerized through the unsaturation.

5. A copolymer consisting of from 4 to 35% by weight of ethyl N-ethyl allyloxamate and from 96 to 65% by weight of ethylene, the said ethyl N-ethyl allyloxamate and the said ethylene being addition copolymerized through the unsaturation.

6. A copolymer consisting of from 4 to 35% by weight ethyl allyloxamate and from 96 to 65% by weight of styrene, the said ethyl allyloxamate and the said styrene being addition copolymerized through the unsaturation.

7. A process for preparing a copolymer of an allyloxamic acid ester represented by the following general formula:

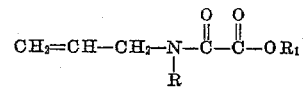

wherein R represents a member selected from the group consisting of a hydrogen atom, an alkyl group containing from 1 to 4 carbon atoms and a hydroxyalkyl group containing from 1 to 4 carbon atoms and $R_1$ represents an alkyl group containing from 1 to 4 carbon atoms, and from 96 to 65% by weight of at least one different polymerizable compound containing at least one aliphatic $CH_2=C<$ group, which comprises heating in the presence of a peroxide polymerization catalyst an aqueous dispersion containing as the sole polymerizable components from 4 to 35% by weight of the said allyloxamic acid ester and from 96 to 65% by weight of at least one different polymerizable compound, other than an allyloxamic acid ester, containing at least one aliphatic $CH_2=C<$ group.

8. A process for preparing a copolymer of ethyl allyloxamate and acrylonitrile which comprises heating in the presence of a peroxide polymerization catalyst an aqueous dispersion containing as the sole polymerizable components from 4 to 35% by weight of ethyl allyloxamate and from 96 to 65% by weight of acrylonitrile.

9. A process for preparing a copolymer of ethyl N-methyl allyloxamate and acrylonitrile which comprises heating in the presence of a peroxide polymerization catalyst an aqueous dispersion containing as the sole polymerizable components from 4 to 35% by weight of ethyl N-methyl allyloxamate and from 96 to 65% by weight of acrylonitrile.

10. A process for preparing a copolymer of ethyl allyloxamate and methyl methacrylate which comprises heating in the presence of a peroxide polymerization catalyst an aqueous dispersion containing as the sole polymerizable components from 4 to 35% by weight of ethyl allyloxamate and from 96 to 65% by weight of methyl methacrylate.

11. A process for preparing a copolymer of ethyl N-ethyl allyloxamate and ethylene which comprises heating in the presence of a peroxide polymerization catalyst an aqueous dispersion containing as the sole polymerizable components from 4 to 35% by weight of ethyl N-ethyl allyloxamate and from 96 to 65% by weight of ethylene.

12. A process for preparing a copolymer of ethyl allyloxamate and styrene which comprises heating in the presence of a peroxide polymerization catalyst an aqueous dispersion containing as the sole polymerizable components from 4 to 35% by weight of ethyl allyloxamate and from 96 to 65% by weight of styrene.

References Cited in the file of this patent

UNITED STATES PATENTS

| | | |
|---|---|---|
| 2,313,565 | McDowell et al. | Mar. 9, 1943 |
| 2,531,410 | D'Alelio | Nov. 28, 1950 |
| 2,533,204 | Caldwell | Dec. 12, 1950 |
| 2,566,250 | Reynolds et al. | Aug. 28, 1951 |
| 2,626,944 | Coover et al. | Jan. 27, 1953 |
| 2,686,173 | Sauer | Aug. 10, 1954 |
| 2,734,888 | D'Alelio | Feb. 14, 1956 |